Oct. 18, 1932.  H. V. REED  1,882,897
FRICTION CLUTCH
Original Filed Jan. 3, 1927
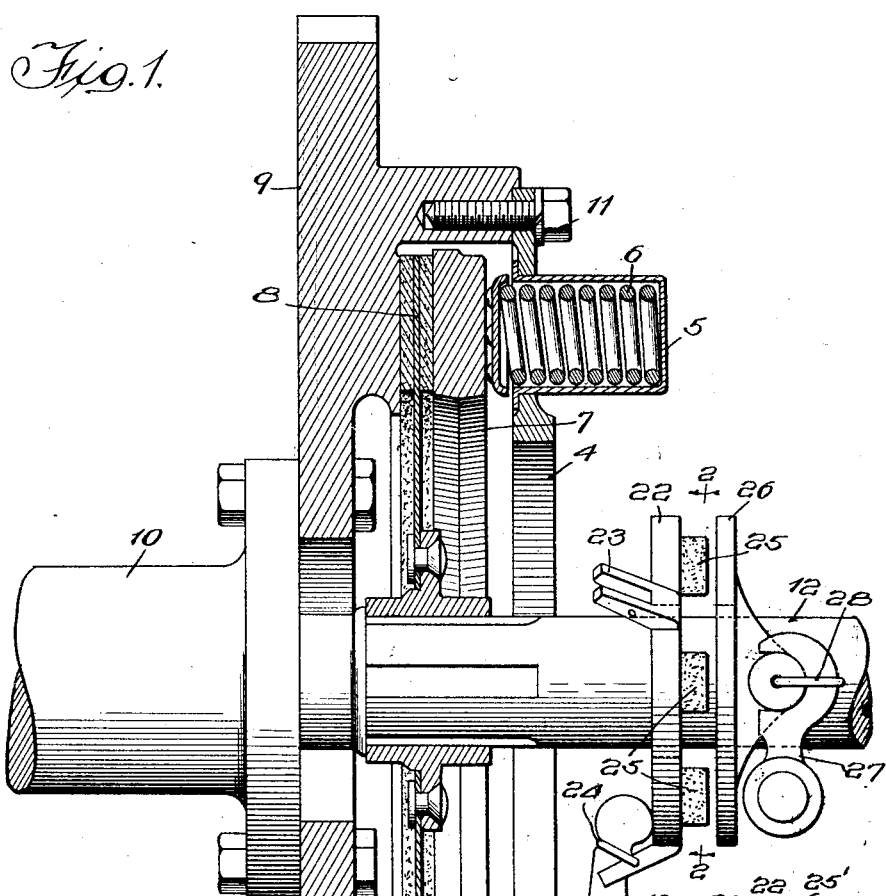
Fig.1.
Fig.2.
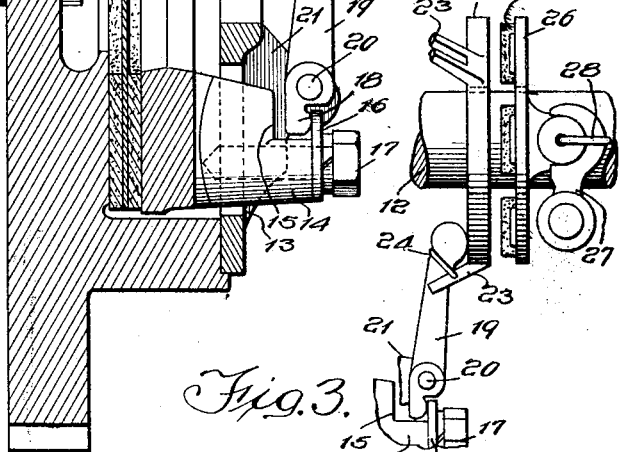
Fig.3.
Witness:
William P. Kilroy
Inventor:
Harold V. Reed
By Wm. J. Belt Patented Oct. 18, 1932

1,882,897

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Original application filed January 3, 1927, Serial No. 158,502. Divided and this application filed February 27, 1931. Serial No. 518,813.

This is a division of my application, Serial No. 158,502, filed January 3, 1927.

This invention relates to friction clutches of the character wherein the friction members are engaged by the direct action of springs and are disengaged by release levers.

Heretofore clutch release levers in this type of clutch have operated upon a ball thrust bearing maintained by a suitable guide and other devices in a definite normal relation to and concentric with the driven shaft. This bearing required lubrication and considerable difficulty was often encountered in accomplishing this. One of the objects of this invention is to supplant a bearing of this character by one not requiring any guiding means on the transmission case nor any lubrication.

Further objects are to provide a clutch wherein the wearing parts of the release device may be quickly and readily replaced with comparatively little cost; and wherein the release device will embody oppositely disposed corresponding cooperating members on either of which self-lubricating anti-friction devices may be arranged.

In the selected embodiment of the invention illustrated in the accompanying drawing.

Fig. 1 is a sectional view of a direct spring acting clutch with which one embodiment of my invention is associated;

Fig. 2 is a view taken substantially on the line 2—2 on Fig. 1; and

Fig. 3 is a fragmentary view, similar to Fig. 1, showing a modified form of construction for the release device.

In the embodiment of the invention illustrated in the accompanying drawing 4 indicates the cover plate of the clutch, and it has sockets 5 to receive springs 6 bearing directly upon the thrust or pressure ring 7 to press the friction faced clutch or driven plate 8, splined on the driven shaft 12, into engagement with the flywheel 9 fast on the driving or crank shaft 10. The cover plate is secured to the flywheel by bolts 11 and has openings 13 therein through which posts 14, rigid with and projecting outwardly from the pressure ring 11, are extended. Plates 16 are secured to the posts by bolts 17 and project over the recesses 15 in the posts to form stops engageable by projections 18 on the clutch levers or fingers 19 pivotally mounted at 20 in ears 21 rigid with the cover plate. These levers extend radially of the shaft 12 and are revolvable thereabout. A lever plate 22 is loosely arranged on the driven shaft 12 and is slidable thereon and has arms 23 projecting from the periphery thereof. The levers 19 are extended through bifurcations in the arms 23 and are detachably retained by bails 24 or other suitable securing means. Since each of the levers is connected to the plate 22 it is manifest that they will act conjointly. Mounted on the face of the plate 22 are shoes 25 of some suitable anti-friction bearing material such as a graphite composition. The usual ball thrust bearing is supplanted by a thrust release plate 26 loosely arranged on the shaft 12 and is carried by a release yoke 27 to which it is connected by spring devices 28, as disclosed fully in my Patent No. 1,611,577, patented December 21, 1926. When the yoke is operated the plate 26 is moved axially of the shaft toward and into engagement with the shoes 25, and as the plate 26 continues to move the plate 22 will be moved axially along the shaft 12 and the levers 19 will be turned about the pivots 20 therefor to thereby move the friction faced plate 8 from engagement with the flywheel 9 against the action of the springs 6, thereby disengaging the clutch. Since the shoes 25 are formed of an anti-friction material it is manifest that the coefficient of friction between the plates 22 and 26 will be reduced to a minimum, and moreover by reason of the innate characteristics of these shoes no lubrication need be provided.

In Fig. 3 a modified form of construction is shown and herein the friction shoes 25' are mounted on the plate 26 instead of the plate 22, and manifestly this device will function in all respects similar to the device disclosed in Fig. 1.

Both the shoes 25 and 25' are mounted on the respective plates at circumferentially spaced intervals as, for example, intervals of ninety degrees and as illustrated in Fig. 2 the shoes 25 are mounted on the plate 22 at such intervals, but it is to be understood that the shoes might be spaced otherwise without departing from the ambit of the invention.

While I have illustrated and described a selected embodiment of my invention it is to be understood that this is capable of variation and modification and I therefore do not wish to be limited to the precise details set forth but desire to avail myself of such changes and alterations as fall within the purview of the following claims:

I claim:

1. In a friction clutch, the combination of a cover plate, a plurality of clutch levers mounted on the cover plate, a driven shaft, a plate movable on the shaft for cooperation with clutch release devices, and arms on the plate having bifurcations to receive the free ends of the levers to hold the levers in operative relation to the plate.

2. In a friction clutch, the combination of a cover plate, a plurality of clutch levers mounted on the cover plate, a driven shaft, a plate movable on the shaft for cooperation with clutch release devices, arms on the plate having bifurcations to receive the levers, and bails engaging the arms and the levers to hold the levers in operative relation to the plate.

HAROLD V. REED.